US011405455B2

(12) United States Patent
Enz

(10) Patent No.: US 11,405,455 B2
(45) Date of Patent: Aug. 2, 2022

(54) ELASTIC SCALING IN A STORAGE NETWORK ENVIRONMENT

(71) Applicant: OVH US LLC, Newark, DE (US)

(72) Inventor: Michael Enz, S. Fargo, ND (US)

(73) Assignee: OVH US LLC, Newark, DE (US)

( * ) Notice: Subject to any disclaimer, the term of this patent is extended or adjusted under 35 U.S.C. 154(b) by 145 days.

(21) Appl. No.: 16/697,626

(22) Filed: Nov. 27, 2019

(65) Prior Publication Data

US 2020/0169607 A1 May 28, 2020

Related U.S. Application Data

(60) Provisional application No. 62/771,840, filed on Nov. 27, 2018.

(51) Int. Cl.
*H04L 67/1097* (2022.01)
*H04L 49/25* (2022.01)
*H04L 67/1095* (2022.01)

(52) U.S. Cl.
CPC ......... *H04L 67/1097* (2013.01); *H04L 49/25* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 11,093,146 B2* | 8/2021 | Karr | G06F 3/0649 |
| 11,095,706 B1* | 8/2021 | Ankam | G06F 21/31 |
| 2014/0317059 A1* | 10/2014 | Lad | G06F 11/1458 |
| | | | 707/649 |
| 2016/0196324 A1* | 7/2016 | Haviv | G06F 3/067 |
| | | | 707/649 |
| 2017/0364307 A1* | 12/2017 | Lomelino | G06F 13/4022 |
| 2018/0260125 A1* | 9/2018 | Botes | G06F 3/065 |
| 2018/0321985 A1* | 11/2018 | Kakaiya | G06F 15/76 |
| 2018/0337991 A1* | 11/2018 | Kumar | H04L 69/26 |
| 2021/0263651 A1* | 8/2021 | Sandvig | G06F 3/0671 |

OTHER PUBLICATIONS

Koltsidas, Ioannis, et al. IBM Storage and the NVM Express Revolution, May 4, 2017, IBM Redbooks Point-of-View. http://www.redbooks.ibm.com/abstracts/redp5437.html?Open (Year: 2017).*

* cited by examiner

*Primary Examiner* — Uzma Alam
(74) *Attorney, Agent, or Firm* — BCF LLP

(57) ABSTRACT

Disaggregated storage clusters are disclosed. These disaggregated storage clusters include a plurality of storage targets coupled to each other through a switch and including storage targets including storage and data services storage targets. Data and requests can for storage areas maintained by the storage cluster can be routed between the target of the storage clusters based on pipeline definitions for those storage areas.

21 Claims, 5 Drawing Sheets

ELASTIC SCALING IN A STORAGE NETWORK ENVIRONMENT

RELATED APPLICATIONS

This application claims a benefit of priority under 35 U.S.C. 119 to U.S. Provisional Patent Application Ser. No. 62/771,840, filed Nov. 27, 2018, entitled "ELASTIC SCALING IN A STORAGE NETWORK ENVIRONMENT," by Enz, which is incorporated herein in its entirety by reference.

TECHNICAL FIELD

This disclosure relates to the field of data storage. More particularly, this disclosure relates to storage networks. Even more particularly, this disclosure relates to embodiments of disaggregated computation in storage networks, including the dynamic reconfiguration or scaling of storage networks including such disaggregated computation.

BACKGROUND

Businesses, governmental organizations and other entities are increasingly using larger and larger volumes of data necessary in their daily operations. This data represents a significant resource for these entities. To store and provide rapid and reliable access to this data, storage networks may be utilized. A storage network is composed of a group of computer systems (or nodes) coupled via a communication medium, where each of the nodes is coupled to targets that may include hardware resources, including the storage resources, (e.g., drives or storage media) of the storage network. While storage may be the main objective of these storage networks, there may be a wide number of associated data processing associated with such storage networks, including for example, processing associated with data encryption, encoding (or transcoding), the computing of parity data for RAID, thin provisioning, or other types of processing.

To account for both the storage and the processing needs in storage networks, the hardware storage resources of a storage network are typically quite complex. For example, in many cases storage targets may include x86 base storage devices comprising multiple CPU cores, dedicated RAM and network interface cards. Not only are these types of storage targets expensive, but they consume a great deal of power. Recently, less expensive storage hardware platform shave begun to emerge. Moreover, more specialized processing hardware has also been developed, such as System on a Chip (SOC) devices. Certain of these types of specialized hardware may be especially useful in speeding certain tasks that may be desired in association with such storage networks, including for example encryption or encoding.

It is thus desirable to effectively utilize these less expensive hardware storage solutions in storage networks to reduce amount of computational power needed in such storage networks or to scale the presence of computational power present in the storage network to a desired or needed level.

SUMMARY

As noted, while storage may be the main objective of these storage networks, there may be a wide number of associated data processing associated with such storage networks, including for example, processing associated with data encryption, the computing of parity data for RAID, thin provisioning, or other types of processing.

To account for both the storage and the processing needs in storage networks, the hardware storage resources of a storage network were typically quite complex. For example, in many cases storage targets may include x86 base storage devices comprising multiple CPU cores, dedicated RAM and network interface cards. Not only are these types of storage targets expensive, but they consume a great deal of power. Recently, less expensive storage hardware platform shave begun to emerge. For a variety of reasons, it is thus desirable to utilize these less expensive hardware storage solutions in storage networks.

In traditional storage networks, however, the initiators or hosts and the storage devices and any other management or appliances within the storage network are usually coupled using different protocols, such as iSCSI or Serial ATA (SATA). This entails that translation must be accomplished between the differing protocols utilized in the storage network. Moreover, such traditional storage networks utilize point to point connections, the number of which are, in most cases, limited by either the protocols themselves or the practical implications of adding additional storage devices or targets into such a point to point storage network.

Thus, while traditional storage arrays have attempted to utilize these less expensive storage solutions, they have done so largely ineffectively. In particular, these traditional storage networks are architected so that they are composed of a storage "head" node for processing that connects to JBOFs as the back end. Traditional storage networks usually must be implemented this way, to accommodate the differing protocols supported by the clients in such storage networks (e.g., iSCSI or NFS) versus the protocols implemented by the JBOFs (e.g., SAS/SATA). As a result, in many cases, the architectures of these traditional storage network that included JBOF were done for high availability (e.g., allowing multiple head nodes to access the same JBOF for redundancy) not the reduction of computational overhead.

Additionally, in traditional storage networks the architecture including these JBOF is considered a scale up architecture, offering some amount of adding either head nodes (for processing) or JBOFs (for capacity). Accordingly, the traditional storage networks must be architected and provisioned for a worst case computational scenario. In other words, the number of head nodes in a traditional storage architecture usually must include a sufficient number of head nodes to accommodate a maximum processing load anticipated. As such, these traditional storage networks have not solved some of the most pressing issues, including efficient use of computing resources.

Recently, certain advancements in storage networks have been made. For example, Non-Volatile Memory Express (NVMe or NVME) or Non-Volatile Memory Host Controller Interface Specification (NVMHCIS), an open logical device interface specification for accessing non-volatile storage media, has been designed from the ground up to capitalize on the low latency and internal parallelism of flash-based storage devices. Thus, in emerging storage networks, the resources of the storage network storage may be coupled over a communication medium through a switch (such as a Personal Computer Interface (PCI) Express (PCIe or PCIE) bus or switch) and NVMe is used to communicate between the storage resources.

Embodiments as disclosed and presented herein may serve to disaggregate the computation required in storage networks from the computational needs that may be required in such storage networks. Embodiments may make use of emerging hardware for NVME over fabric solutions. Such hardware may include a low power, low cost, Fabric attached Bunch of Flash (FBOF). A FBOF may include a set of flash memory storage media accessible over a fabric based network interface typically implemented using either a hardware network-to-storage bridge chip, or a low power, programmable System on a Chip (SoC) solution. Usually these FBOFs may be implemented in a chassis with power plane and a set of pluggable slots that may be utilized for controllers or media. Accordingly, while usually not suitable for advanced data services, these FBOFs provide a flexible, high-speed network access to NVMe drives and are an excellent "back end" for containing the storage media.

While the use of these FBOFs may provide flexible and scalable storage targets for embodiments NVMeoF storage networks, the processing (e.g., RAID processing, encryption, thin provisioning) may be decoupled from the storage through the use of data service (DS) targets or nodes (terms used herein interchangeably). These data services nodes may be substantially the converse of these FBOFs. In embodiments, these DS nodes may be servers or machines with no (or few) storage media but a plurality of network interfaces (e.g., network cards or the like) and high processing capabilities. The algorithms or other data services associated with the processing of data in association with storage of the data in the storage network may be executed on these DS nodes.

Embodiments of these DS nodes may thus be used as independent targets (e.g., from the other targets in the storage network) and may also serve as initiators to the other storage media in the storage network (e.g., the FBOFs or other storage). In this manner, storage requiring computationally intensive processing may be implemented through the data services node (e.g., storage provisioned through or requests otherwise routed through the DS nodes). Storage not requiring the algorithms or other data services implemented on the DS may be provided using the storage media (e.g., FBOFs) in the storage network.

While a dichotomy has been drawn between storage nodes and data services nodes for storage clusters according to embodiments for purposes of explanation, it will be more generally understood that targets in the storage networks according to embodiments may comprise a spectrum of functionality relating to storage or data services, with both (or only) storage or data services available on some targets where the proportion of storage to data services, or the type of data services or storage available, with respect to a given target is dependent on a variety of criteria, including the hardware used to implement the target or the other nodes available in the storage cluster. Moreover, the type, or balance of, storage or data services available on a particular target may be reconfigured (e.g., in some instances dynamically) during operation of the storage cluster to which it belongs.

Accordingly, embodiments of disaggregated storage clusters as disclosed may result in a number of advantages. For example, these disaggregated storage cluster may have a data centric approach. Because the rate of increase in speed of processors is not enough to increase with demands placed on those processors (e.g., in the context of storage services or network) it is desired to move to specialized processors for various tasks (which are getting faster). But because such specialized processors are task specific the use of such specialized processors in storage context necessitates have method for routing the data. Embodiments herein provide a data centric view of processing allowing data to easily move between the hardware or software that can process or store that data most efficiently.

Specifically, embodiments may allow the directing and redirecting of data or access in a storage network and the compute nodes (e.g., clients or hosts) to a substantially optimal service or storage node using the same protocol as they may be connected over the same storage network (e.g., fabric). In other words, the protocol used to access a given storage node or data service may be the same protocol used to communicate with the other storage nodes or services in the cluster, and similarly, in some embodiments the compute nodes or hosts themselves. As such data may be communicated between nodes or services without user involvement or protocol translation.

Consequently, when establishing a storage area, embodiments of storage clusters as depicted herein may create a path or pipeline of services and storage in the cluster for a given storage area (e.g., volume or namespace) based on a configuration for the storage area. As the protocol is the same for accessing and communicating between the nodes of the storage cluster any point in the cluster may be used to access these storage areas and these access routed along the configured pipeline for the storage cluster with relatively little overhead.

Moreover, due to the elastic nature of the architecture of embodiments it is straightforward to scale the cluster to the demands of a given deployment, adding more or less hardware or services based on the demands place on the cluster. Additionally, functionality such as services and processing may be moved off compute node and closer to the storage, increasing efficiency by requiring less movement of data.

Thus, this scaling may serve to reduce amount of computational power needed in such storage networks or to scale the presence of computational power present in the storage network to a desired or needed level, which may serve not only to reduce excess computational overhead, but similarly cost and power consumption, among other items.

In one embodiment, a disaggregated storage cluster may include a switch and a plurality of storage targets coupled to each other through the switch and communicating with one another through the switch according to the same protocol. The storage targets can include at least a first storage target including storage and a second storage target comprising a data services target including a data service.

Each of the storage targets comprises a storage area definition for a storage area, the storage area definition synchronized across the storage targets and including an identifier for the storage area associated with a pipeline definition for the storage area. The pipeline definition includes an ordered set of the plurality of storage targets, including the data service of the data services target followed by the storage of the first storage target.

The second storage target is adapted to receive a first request for the storage area including first data and the identifier for the storage area, perform the data service on the first data based on the identifier for the storage area to produce second data, and route the second data to the first storage target through the switch according to the protocol in association with the identifier.

The first storage target is adapted to receive the second data and the identifier for the storage area from the second storage target through the switch according to the protocol in association with the identifier and store the second data in the storage at the first storage target based on the identifier for the storage area.

In some embodiments, the first request is received from a third second storage target, wherein the third storage target is adapted to receive the first request from a user, access the storage area definition for the storage area to determine the pipeline definition for the storage area and, based on the first request (e.g., as type of the request such as a read, write, or other type of request) and the pipeline definition, route the first request to the second storage node through the switch according to the protocol.

In a particular embodiments, the first storage target is adapted to receive a second request for the storage area and the identifier for the storage area, access the second data in the storage at the first storage target based on the identifier for the storage area and route the second data to the second storage target through the switch according to the protocol in association with the identifier.

The second storage target is adapted to receive the second data and the identifier for the storage area from the first storage target through the switch according to the protocol in association with the identifier, perform the data service on the second data based on the identifier for the storage area to produce the first data and route the first data to a user in response to the second request.

In another embodiment, the second request is received from the third second storage target, and the third storage target is adapted to receive the second request from the user, access the storage area definition for the storage area to determine the pipeline definition for the storage area and, based on the second request (e.g., as type of the request such as a read, write, or other type of request) and the pipeline definition, route the second request to the first storage node through the switch according to the protocol.

In one embodiment, the storage can be a key/value store or block storage.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
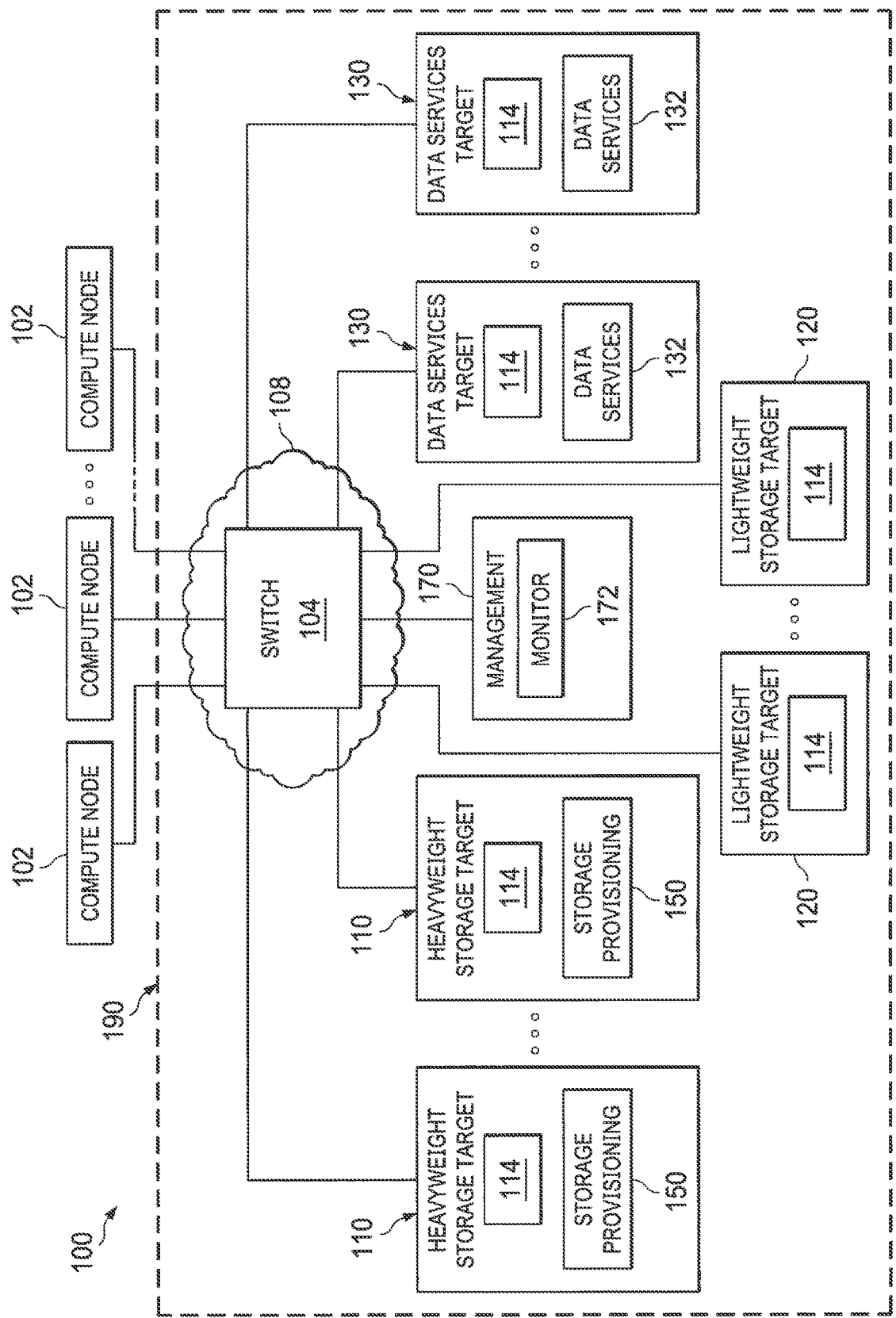
FIG. 1 is a diagrammatic representation of one embodiment of a disaggregated storage network including embodiments of data services targets.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing specific embodiments, some context may be useful. Businesses, governmental organizations and other entities are increasingly using larger and larger volumes of data necessary in their daily operations. This data represents a significant resource for these entities. To store and provide rapid and reliable access to this data, storage networks may be utilized. A storage network is composed of a group of computer systems (or nodes) coupled via a communication medium, where each of the nodes is coupled to targets that may include hardware resources, including the storage resources, (e.g., drives or storage media) of the storage network. While storage may be the main objective of these storage networks, there may be a wide number of associated data processing associated with such storage networks, including for example, processing associated with data encryption, the computing of parity data for RAID, thin provisioning, or other types of processing.

To account for both the storage and the processing needs in storage networks, the hardware storage resources of a storage network were typically quite complex. For example, in many cases storage targets may include x86 base storage devices comprising multiple CPU cores, dedicated RAM and network interface cards. Not only are these types of storage targets expensive, but they consume a great deal of power. Recently, less expensive storage hardware platform shave begun to emerge. These include what are known as Just a Bunch of Disks (JBOD) or Just a Bunch of Flash (JBOF). It is thus desirable to utilize these less expensive hardware storage solutions in storage networks to reduce amount of computational power needed in such storage networks or to scale the presence of computational power present in the storage network to a desired or needed level which may serve not only to reduce excess computational overhead, but similarly cost and power consumption, among other items.

In traditional storage networks, however, the initiators or hosts and the storage devices and any other management or appliances within the storage network are usually coupled using different protocols, such as iSCSI or Serial ATA (SATA). This entails that translation must be accomplished between the differing protocols utilized in the storage network. Moreover, such traditional storage networks utilize point to point connections, the number of which are, in most cases, limited by either the protocols themselves or the practical implications of adding additional storage devices or targets into such a point to point storage network.

Thus, while traditional storage arrays have attempted to utilize these less expensive storage solutions, they have done so largely ineffectively. In particular, these traditional storage networks are architected so that they are composed of a storage "head" node for processing that connects to JBOFs as the back end. Traditional storage networks usually must be implemented this way, to accommodate the differing protocols supported by the clients in such storage networks (e.g., iSCSI or NFS) versus the protocols implemented by the JBOFs (e.g., SAS/SATA). As a result, in many cases, the architectures of these traditional storage network that included JBOF were done for high availability (e.g., allowing multiple head nodes to access the same JBOF for redundancy) not the reduction of computational overhead.

Additionally, in traditional storage networks the architecture including these JBOF is considered a scale up architecture, offering some amount of adding either head nodes (for processing) or JBOFs (for capacity). Accordingly, the traditional storage networks must be architected and provisioned for a worst case computational scenario. In other words, the number of head nodes in a traditional storage architecture usually must include a sufficient number of head nodes to accommodate a maximum processing load anticipated. As such, these traditional storage networks have not solved some of the most pressing issues, including efficient use of computing resources.

Recently, certain advancements in storage networks have been made. For example, Non-Volatile Memory Express (NVMe or NVME) or Non-Volatile Memory Host Controller Interface Specification (NVMHCIS), an open logical device interface specification for accessing non-volatile storage media, has been designed from the ground up to capitalize on the low latency and internal parallelism of flash-based storage devices. Thus, in emerging storage networks, the resources of the storage network storage may be coupled over a communication medium through a switch (such as a Personal Computer Interface (PCI) Express (PCIe or PCIE) bus or switch) and NVMe is used to communicate between the storage resources. This communication medium may, for example, be a communication network such as Ethernet, Fibre Channel (FC) or InfiniBand. These types of storage clusters are often referred to as NVMe over Fabrics (NVMeoF or NVMEoF). For NVMeoF storage networks, certain nodes may be responsible for serving data from the storage media (e.g., drives) to network attached client computers. The drives or other storage resources of the cluster are almost always non-volatile memory; in some cases flash memory in the form of a solid-state drive (SSD).

Embodiments as disclosed and presented herein may serve to disaggregate the computation required in storage networks from the computational needs that may be required in such storage networks. Embodiments may make use of emerging hardware for NVME over fabric solutions. Such hardware may include a low power, low cost, Fabric attached Bunch of Flash (FBOF). A FBOF may include a set of flash memory storage media accessible over a fabric based network interface typically implemented using either a hardware network-to-storage bridge chip, or a low power, programmable System on a Chip (SoC) solution. Usually these FBOFs may be implemented in a chassis with a power plane and a set of pluggable slots that may be utilized for controllers or media. Accordingly, while usually not suitable for advanced data services, these FBOFs provide a flexible, high-speed network access to NVME drives and are an excellent "back end" for containing the storage media. These storage targets can thus offer volumes or key/value namespaces for use in a storage cluster.

While the use of these FBOFs may provide flexible and scalable storage targets for embodiments NVMeoF storage networks, the processing (e.g., RAID processing, encryption, thin provisioning) may be decoupled from the storage through the use of data service (DS) nodes or targets (the terms target and node will be used herein interchangeably). These data services nodes may be substantially the converse of these FBOFs. In embodiments, these DS nodes may be servers or machines with no (or few) storage media but a plurality of network interfaces (e.g., network cards or the like) and high processing capabilities. The algorithms or other data services associated with the processing of data in association with storage of the data in the storage network may be executed on these DS nodes.

Embodiments of these DS nodes may thus be used as independent targets (e.g., from the other targets in the storage network) and may also serve as initiators to the other storage media in the storage network (e.g., the FBOFs or other storage). In this manner, storage requiring computationally intensive processing may be implemented through the data services node (e.g., storage provisioned through or requests otherwise routed through the DS nodes). Storage not requiring the algorithms or other data services implemented on the DS may be provided using the storage media (e.g., FBOFs) in the storage network.

In particular, in certain embodiments, the data services may be contained within a standard, driveless server that functions as a DS node (or alternatively may also have local storage). This server may have several network adapters such that it may function like an NVMeoF initiator (e.g., on the "back-end") to remotely connect to media drives (e.g., often connecting to multiple different FBOFs). These remote drives then act the same as local drives in a typical NVMeoF target. The data service node can also act as a NVMeoF target (e.g., on the "front-end") to export volumes or key/value namespaces to other initiators (e.g., hosts or the like). The exported volumes or namespaces may include volumes or namespaces including data on which processor intensive operations, including RAID levels, erasure encoding, encryption, compression, end-to-end data protection, or custom data transformations (such as transcoding data into multiple formats) are to be applied.

Thus, in the storage network employing one or more data services nodes there may be multiple paths to the storage media of the storage network, a direct path (e.g., a path where the target or path does not include a DS node and another path where the target is the DS node or where the path includes a DS node). Additionally, all of these paths may utilize the same switched fabric (e.g., RoCE (RDMA over Converged Ethernet), InfiniBand, TCP, etc.), removing both the need for protocol translation and limitations on connectivity that may be imposed by such protocols.

By implementing these data services in a dedicated data services node (or another type node where they may be accessed, such as in association with a storage node) and thus decoupling the data services from the storage in the storage networks a number of advantages may be achieved. Importantly, these data services may be dynamically and independently provisioned in the storage network substantially without affecting the available storage. This ability may reduce wasted CPU resources in traditional storage networks.

By utilizing separate DS nodes (or more generally separate data services that may be independently accessed), embodiments may allow elastic scalability in the processing power of a storage network, where the number of these DS nodes may increase or decrease to any desired level in the storage network. For example, orchestration frameworks (such as Kubernetes, Mesosphere Marathon, Google Container Engine, Amazon EC2 Container Service, Docker, etc.) can be used to dynamically launch or shutdown the DS nodes in the datacenter. Accordingly, the number of DS nodes operational in the storage network may be made to vary based on various criteria, including for example the I/O workload in the storage network or media device errors.

One of the many benefits of this type of elastic scalability is to minimize how many CPU cycles are wasted in the storage network. Disaggregated data service computations using DS nodes may serve to help achieve this goal by sharing CPU (or other) resources. Often these resources are needed at different times during the day (or month) to handle uncommon situations such as drive failures or data redundancy scans. By sharing larger CPU cores, the data center can maximize the utilization of the CPU and minimize the number of CPUs required.

As another advantage, as the fabric used to access both the DS nodes and storage media (e.g., FBOFs) in the storage network may be the same switched fabric, embodiments may not be hamstrung by the limited connection options of the traditional hardware (e.g., SAS/SATA) that utilizes limited point-to-point connections. As such, the hardware underpinnings of embodiments as disclosed may also itself be scalable.

Similarly, as another advantage, as embodiments utilize a common fabric for the front and back end, the initiator systems of the storage network may selectively access either node (e.g., DS node or storage node such as an FBOF) depending on the data service requirements. This capability may avoid using the DS nodes for simple storage operations that may be handled entirely by the FBOF, further conserving CPU cycles (e.g., on the DS nodes) for requests that may be handled at the storage node.

The implementation of these DS nodes may also present the opportunity to share specific (and in some cases expensive) hardware or storage. In particular, in some cases modern datacenters or storage networks can deploy hardware specific data processing offload devices, such as PCIe attached ASIC/FPGA co-processors or SOC devices. These devices can be extremely efficient at the data processing tasks, but they add significant cost. Similar to the CPUs, the DS nodes reduce costs by allowing these device to be shared across the storage network and maintaining high utilization of this custom hardware. From a practical consideration, a DS node may also provide the necessary PCIe connections to interface to these offload devices.

Additionally, by implementing certain data services, such as RAID in a DS node, the ability to allow shared RAID volume across compute nodes (e.g., hosts or initiators) may be provided. By providing a node (e.g., a DS node) that does storage processing for all shares, the ability to automatically update all stripes across a RAID share or volume may be easily provided. In a similar vein, if the data processing services or hardware require updating, the management or upkeep of these data services may be confined to these DS nodes and is not needed with respect to the other storage targets in the network.

Attention is now directed to FIG. 1 which depicts a topology of one embodiment of a storage cluster employing one or more data services (DS) nodes. In the depicted embodiment, the storage cluster 100 includes a set of compute nodes 102 coupled to a switch 104 over a communication medium 108. A set of storage targets is also coupled to the switch over the communication medium 108. These storage targets may include heavyweight (e.g., server based) storage targets 110, lightweight storage targets 120 and DS storage targets 130. These storage targets 110, 120, 130 may operate as a cluster using cluster synchronization software such as those offered by Etcd or MongoDB that may be utilized to synchronize these storage targets 110, 120, 130 such that they operate as a cluster. The compute nodes 102 (or applications thereon) may access storage provided by the storage media through these storage targets.

In particular, the switch 104 may be a PCIe switch, an Ethernet switch, an InfiniBand switch, a Fibre Channel switch or another type of switch as is known in the art. The communication medium 108 can thus be one or more of RoCE, InfiniBand, Fibre Channel, iWARP, Ethernet, etc., and NVME or NVMeoF may be used to communicate between the compute nodes 102 and storage targets 110, 120, 130 over the communication medium 108 through switch 104. Additionally, storage targets 110, 120, 130 may communicate to one another in the same manner over communication medium 108.

While a single switch 104 has been depicted for purposes of ease of illustrations it will be noted that multiple switches 104 may be present and these switches may be of the same, or different, types. Thus, the compute nodes 102 and storage targets 110, 120, 130 may be coupled to one another through multiple communication mediums or some compute nodes 102 may only be coupled to one storage medium or the other while storage targets of the storage network 100 may be coupled to all communication mediums 108 to allow access by all compute nodes 102. Other arrangements are possible and are fully contemplated herein.

As mentioned, storage targets 110, 120, 130 in the storage network 100 may include heavyweight (e.g., server based) storage targets 110, lightweight storage targets 120 and DS storage targets 130. Specifically, in certain embodiments the heavyweight storage targets 110 may include standard x86 server based storage targets comprising (usually multiple) relatively powerful CPUs, each with their own network interface cards (NICs) and dedicated memory along with the storage media used to provide storage that may be accessed or utilized by the other resources in the storage network 100, including the compute nodes 102 (or applications thereon). This storage may be, for example, traditional block storage or may be key/value storage, such that the storage targets 120 may provide volumes or namespaces (which will be utilized herein interchangeably without loss of generality) on associated storage media. In the case where at least some key/value namespaces may be provided by the heavyweight storage target 110, this key/value storage may be implemented using a (e.g., native) key/value storage media or a block to key/value storage level translator. While providing fast access and providing a relatively high level of performance and processing, these server based storage targets 110 may have the disadvantages of consuming a relatively high amount of power and higher cost.

Accordingly, other storage targets in the storage network 100 may include lightweight storage targets 120. These lightweight storage targets 120 may include a set of storage media and one or more relatively lightweight processors, such as a system on chip (SOC) or the like which may, for example, be a part of a network interface card. The storage of media of the lightweight storage targets 120 may also be used to provide storage that may be accessed or utilized by the other resources in the storage network 100, including the compute nodes 102 (or applications thereon). However, these lightweight storage targets 120 may consume relatively less power while costing relatively less as well. Such a lightweight storage target 120 may be, for example, a FBOF.

The storage provided by a lightweight storage target 120 may also be, for example, traditional block storage or may be key/value storage, such that the lightweight storage targets 120 may provide volumes or namespaces on associated storage media. In the case where at least some key/value namespaces may be provided by the lightweight storage target, this key/value storage may be implemented using a (e.g., native) key/value storage media. Alternatively, the lightweight storage target 120 may implement a block to key/value storage level translator. However, these lightweight storage targets 120 may consume relatively less power while costing relatively less as well. Such a lightweight storage target 120 may be, for example, a FBOF.

As these lightweight storage targets 120 may be lower cost, consume less power and devote a large amount of their available space (e.g., slots in a chassis) to storage itself, it may be attractive to use a relatively higher number of such lightweight storage targets 120 in storage network 100. However, in some cases, there is extensive data processing that needs to accompany the storage of data (or other functionality) in the storage network 100, such as, for example, when storage of certain data requires encryption, resilience encoding (e.g., RAID processing, erasure or other replication encoding), encoding (transcoding), thin provisioning or otherwise. These lightweight storage targets 120 may not be well suited to preforming such processor intensive tasks.

Accordingly, in certain embodiments, storage network 100 may include one or more DS storage targets 130. These DS storage targets 130 may include a number of network interface cards for the communication medium 108 such that the DS target 130 may appear as a target to compute nodes 102 and an initiator or host to other targets (e.g., heavyweight storage target 110 or lightweight storage targets 120) in the storage network 100. These DS storage targets 130 may include a relatively higher amount of processing power than lightweight storage targets 120 and may, in some embodiments, have processing power equivalent to, or greater than, heavyweight storage targets 110. In some embodiments, DS storage targets 130 may not have any storage media that may be accessed by an initiator or host, or that is otherwise provided as part of the storage offered by the storage network 100 to compute nodes 102.

Data or storage processing services 132 may thus be executed on the DS storage targets 130. These storage processing services 132 may be, for example, storage processing algorithms involved with encryption, resilience encoding (e.g., RAID processing, erasure, error correction encoding, or other replication encoding), encoding (transcoding), hashing, replication, text based regular expression filtering or thin provisioning in association with storage provided by the storage network 100 or otherwise. The storage processing services 132 may also include the inverse operations as well, e.g. decompression, decryption, etc. It will be understood herein, that a reference to one type of service (e.g., encryption) also include a reference to the inverse type of operation in such cases (e.g., decryption).

DS storage target 130 can thus serve as a target for storage requests over the communication medium 108 or from other storage targets 110, 120 and provide the requested storage and associated services using storage media at the lightweight storage targets 120 (or heavyweight storage targets 110 or located on that data services target 130).

It will be noted here that while a distinction has been drawn between heavyweight storage nodes, lightweight storage nodes and data services nodes for storage clusters according to embodiments, this distinction is purely for purposes of explanation. It will thus be more generally understood that targets in the storage clusters according to embodiments may comprise a spectrum of functionality relating to storage or data services, with both (or only) storage or data services available on some targets, where the proportion of storage to data services, or the type of data services or storage available, with respect to a given target is dependent on a variety of criteria, including the hardware used to implement the target or the other nodes available in the storage cluster. Moreover, the type, or balance of, storage or data services available on a particular target may be reconfigured (e.g., in some instances dynamically) during operation of the storage cluster to which it belongs. Thus, for example, certain data services targets 130 may include storage that may be utilized by the storage cluster while certain heavyweight or lightweight storage targets 120, 130 may include certain data services 132.

Accordingly, when storage is provisioned in the storage network 100, based on the type of storage requested (e.g., by an application on computer node 102), a path or pipeline (used herein interchangeably) associated with a DS storage target 130 (or one or more data services 132 thereof), lightweight storage target 120 or heavyweight storage target 110 may be provided.

Specifically, a user (e.g., either human or automated) at a compute node 102 may request a definition of, or access to, a storage area. When a request for a storage area (e.g., a request for a volume or a namespace, etc.) is received at a storage provisioning 150 application in the storage closer 100 (which is here shown as residing on heavyweight target 110, but which could instead, or additionally, reside at DS storage target 130 or another resource in the storage network 100 entirely) a set of configuration parameters may be obtained in association with that storage, including for example, whether block storage or a key/value namespace is desired along with any data services desired to implement for that storage area (e.g., data encoding, RAID level, etc.).

A storage cluster configurator 114 may then be utilized to define the requested storage area. This storage cluster configurator 114 may reside on substantially all (or a certain subset of) the storage nodes 110, 120, 130 within the cluster. The storage cluster configurator 114 may evaluate the criteria from the storage request may be evaluated in association with the configuration or state of the storage cluster 100 to determine a path for the requested storage area. The determined path may comprise data service targets 130 (or specific data services 132) and lightweight or heavyweight storage targets 120, 130. Based on the determined path, a location for the requested storage to return to the requestor.

For example, if the requested storage is for a volume or namespace on which a level of RAID is being requested, a path associated with a DS storage target 130 that includes a data service 132 implementing RAID encoding and a storage target 120, 130 may be determined. A location associated with data services node 130 including that data services target 130 could then be provided to the requesting user. Similarly, if the requested storage area is for a volume or namespace on which encryption is being requested with a DS storage target 130 that includes a data service 132 implementing encryption and a storage target 120, 130 may be determined. A location associated with data services node 130 including that data services target 130 could then be provided to the requesting user.

Conversely, if the requested storage is for a volume or namespace and no data services provided by DS storage target 130 have been specified by the requesting user a pipeline comprising a single lightweight storage target 120 may be provided and a location associated with a lightweight storage target 120 may be provided to the requesting user.

In this manner, requests for those storage volumes or namespaces that require the data processing services 132 provided by the DS storage target 130 are issued to the DS storage target 130. The data (or other) processing required to implement the request may be accomplished by the data service 132 on the DS target 130 and the data stored (or retrieved) if needed from a corresponding lightweight storage target 120 (or heavyweight storage target 110) by the DS target 130. Conversely, requests for those storage volumes or namespaces that do not need such data processing services 132 are issued from the compute nodes 102 to lightweight storage target 120 (or heavyweight storage target 110) without the involvement of the DS target 130.

Specifically, a pipeline determined for a storage area may comprise an ordered set of storage targets, 110 120, 130 where each storage target in the path may be associated with one or more data services 132 to perform on the data for that storage area and wherein the last storage target in the pipeline may be associated with storage of that data. The storage area can then be defined by the storage cluster configurator 114 in a set of storage area definitions maintained by the cluster 100 and replicated across the nodes 110, 120, 130 of the cluster 100, where each storage area definition includes an identifier for the storage area and a definition of the pipeline for the storage area, including the storage location for that storage area (e.g., the storage node 120, 130 where the data for storage area will get stored).

Additionally, when the path is determined for a requested storage area, storage cluster configurator 114 may configure each of the "hops" of the determined path to receive data associated with that storage area and perform an associated data service 132 or storage of data for that data. This configuration can be accomplished using, for example, a storage area object associated with each hop in the pipeline. A storage area object may include an identifier for a storage area, a service definition (e.g., including a data service to perform on received data and any configuration for that data service) and a destination definition defining a location in the storage cluster 100 where the data is to be routed or stored.

The location returned to the user for accessing the defined storage area may thus be the first storage node 110, 120, 130 in the pipeline defined for the storage area or the storage location where data for the defined storage area where data for the storage area will be stored. It will be noted, however, that the location returned to the user at the compute node 102 for accessing the defined storage area may substantially any node 110, 120, 130 in the cluster. This is because each of these nodes 110, 120, 130 has access to the replicated storage area definition and may seamlessly communicate to the other nodes 110, 120, 130 though switch 104 and communication medium 108. Thus, in cases where a storage node 110, 120, 130 receives an access request (e.g., an I/O request) for a storage area, and the receiving storage node 110, 120, 130 is not in the first node in the pipeline associated with that storage area, the receiving storage node 110, 120, 130 may just route the access request to the first storage node 110, 120, 130 in the pipeline.

By implementing these data services 132 in a dedicated DS target 130 and thus decoupling the data services 132 from the storage in the storage network 100 provided by the lightweight storage target 120 and heavyweight storage targets 110, a number of advantages may be achieved. Importantly, these DS targets 130 may be dynamically and independently provisioned in the storage network 110 substantially without affecting the available storage. This ability may reduce wasted CPU resources in traditional storage networks.

Additionally, utilizing these separate DS targets 130, embodiments may allow elastic scalability in the processing power of a storage network, where the number of these DS targets 130 may increase or decrease to any desired level in the storage network 100. As will be noted, these DS targets 130 may be implemented as standalone hardware, as virtual machines (VM) in the storage network 130 or as some mixture of standalone hardware or VMs. Thus, these DS targets 130 may be brought on or off line based on the demand for data services 132 or on some other criteria. In the case where DS targets 130 are standalone hardware these DS targets 130 may be powered up or powered down (or put in sleep or hibernate modes) based on demand or other criteria, while in cases where these DS targets 130 may be virtual machines, they be instantiated or created (or deprecated) based on demand or other criteria.

In one embodiment, a monitor 172 in the storage network (which as shown may reside on a management device 170 but may also reside on a DS target 130, a heavyweight storage target 120 or another resource of the storage network 100) may monitor one or more statistics associated with a criteria and one or more thresholds in the storage network such as throughput or network traffic to determine when to bring an additional DS target 130 on line or when to take an on line DS target 130 off line.

In one embodiment, monitor 172 may utilize an orchestration framework (such as Kubernetes, Mesosphere Marathon, Google Container Engine, Amazon EC2 Container Service, Docker, Intel Rack Scale Design POD Manager, etc.) to dynamically launch or shutdown DS targets 130 in the storage network 100. Accordingly, the number of DS targets 130 operational in the storage network may be made to vary based on various criteria, including for example the I/O workload in the storage network or media device errors.

As can be seen then, certain embodiments may provide a number of advantages, including the dynamic and elastic provisioning of data services targets 130 on an as needed or on demand basis to reduce power consumption, reduce wasted CPU cycles and cost, and improve processing efficiency generally. As has been discussed, the DS targets may be implemented as VMs to achieve or increase such advantages in some instances. To further achieve or increase such advantages in certain embodiments the lightweight or heavyweight storage targets 120, 110 may also be implemented as VMs.

Thus, in one embodiment, the orchestration framework on the monitor 172 may determine at any given instant based on a criteria associated with the storage network 100 how many DS targets 130, lightweight storage nodes 120 or heavyweight storage nodes 110 are required (e.g., how many VMs of each type of are required) and bring on line (or take off line) the requisite number of VMs of each type. In this manner, (as VMs may usually be instantiated and deprecated more quickly) the dynamism and elasticity of embodiments may be further increased.

Moreover, the same architecture and concepts applied with respect to the DS targets 130 to decouple the data services in a storage network 100 from the other storage targets that include the storage media may applied to share other expensive resources, or resources which may be in high demand. For example, many computational offload engines currently exist, such as Graphical Processing Units (GPUs) or PCIe attached FPGA devices. These offload engines may have to sit on the PCI (or another type of) bus and may be pluggable in a slot of a chassis, similar to a media drive. While it is desired to utilize such computational offload engines, as they may significantly speed up certain processing, they are expensive. Moreover, if they occupy a slot in a storage target in the storage network 100 that may be a slot that cannot be used for storage media, reducing the capacity of that storage target.

To address these issues, a plurality of (the same or different) computational offload engine cards may be places in a DS target 130. In this manner, all of these computational offload engines can be shared effectively be making them available to all the compute nodes of the storage network 100 while having the added advantage of not consuming slots in other storage targets of the storage network 100.

Figure 2:
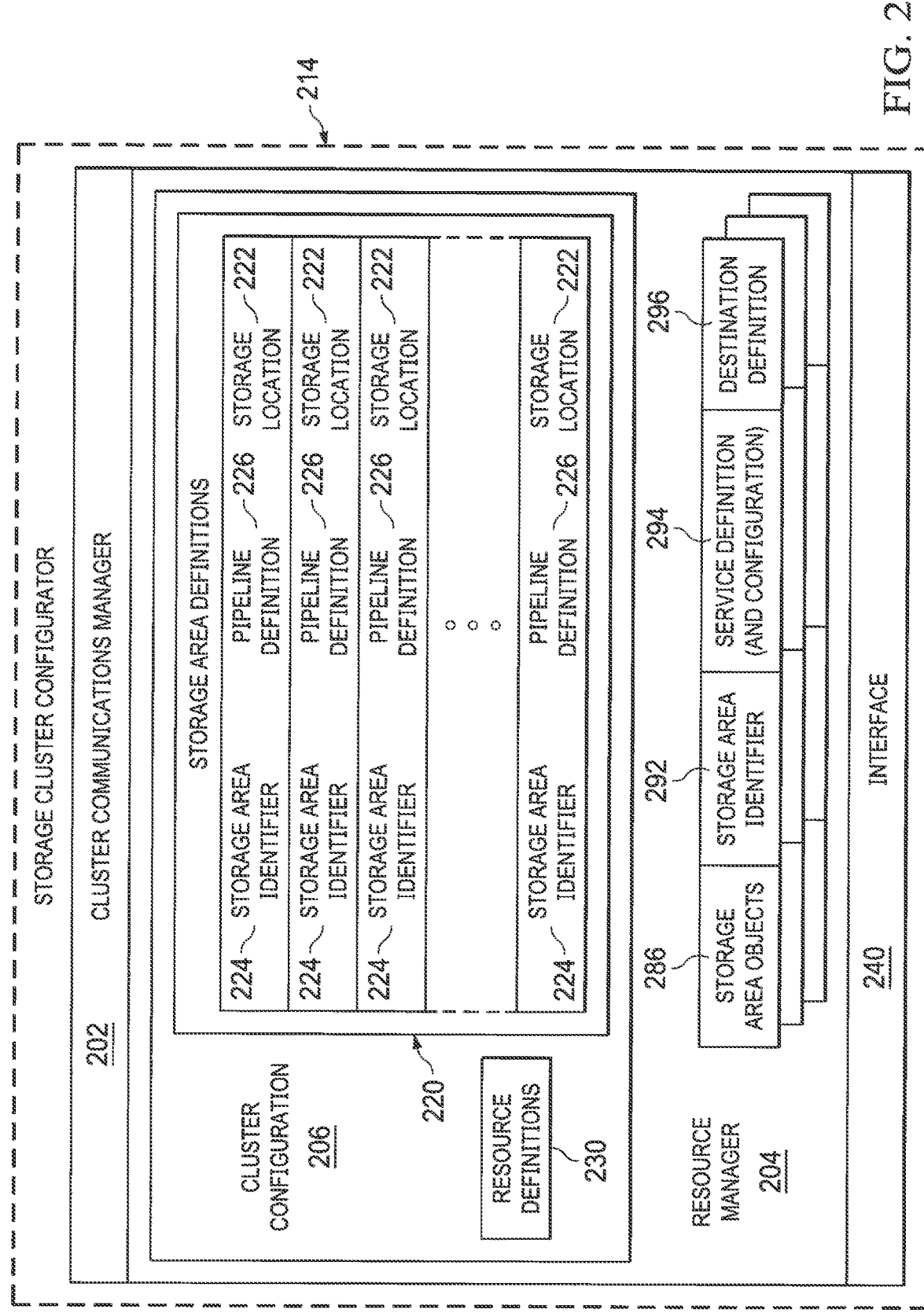
FIG. 2 is a diagrammatic representation of one embodiment of a storage cluster configurator.

It may now be useful to discuss embodiments of a storage cluster configurator in more detail. Turning to FIG. 2, then one embodiment of an architecture for a storage cluster configurator 214 for use on nodes of a storage cluster is depicted. The storage cluster configurator 214 may include a cluster communications manager 202. This cluster communications manager 202 may utilize a communication framework for the entire cluster to see a consistent set of ordered messages. The messages are delivered in the same sequence on each node in the cluster, allowing all nodes to remain consistent on cluster configuration changes.

This layer may also be responsible for maintaining cluster membership, where all nodes are constantly communicating with all other nodes to prove they are still functional. Any failure to receive a heartbeat notification may be detected by any other member of the cluster (e.g., the storage cluster configurator 214 on another node of the cluster). Upon detection, the remaining nodes use the in-order communication network to mark the failed node offline. This cluster communications manager 202 may be part of, or in communication with, cluster management software such as that utilized with Etcd or MongoDB.

Storage cluster configurator 214 may also include a cluster resource manager 204 used to manage abstract resources in a cluster of computers. The resources may represent actual resources (either logical or physical) in the cluster. These resources may be started (or associated with) one or more nodes in the cluster. The resources are substantially constantly (e.g., at an interval) monitored to ensure they are operating correctly, for example, by checking for fatal crashes or deadlocks that prevent normal operation. If any failure is detected, the resource manager 204 uses a set of rules or priorities to attempt to resolve the problem.

The implementation of the storage cluster (e.g., an NVMeoF cluster) requires understanding the underlying hardware platforms and software configuration (e.g., data services configurations). The information about the available programmable interfaces (such as partitioned PCIe switch models), drive locations (such as slots and PCIe switch port locations), data services locations on target nodes, and other configuration are listed in a configuration file.

In particular, the resource manager 204 may include a cluster configuration 206. This cluster configuration 206 can be synchronized across the storage cluster configurators 214 on each node of the cluster by the resource manager 204. In one embodiment, the configuration 206 may allow the resource manager 204 and storage cluster configurator 214 to understand the underlying hardware platform and the data services deployed thereon. The information about the available programmable interfaces (e.g., such as partitioned PCIe switch models), drive locations (such as slots and PCIe switch port locations), and other resources and behaviors are listed in the cluster configuration 206.

Accordingly, in one embodiment, the cluster configuration 206 may include resource definitions 230 that define the set of resources (e.g., logical or physical) of the cluster. The resources of the cluster may be hardware or software resources (including logical or virtual resources) of the cluster, including the data service resources of the cluster. The cluster configuration 206 may accordingly define storage resources, such as drives, groups of drives, partitions, volumes, namespaces, logical unit numbers (LUNs), data services of the cluster, etc.

The definition for a resource may include, for example, the name for a resource within the cluster, a type of the resource, a location or address for the resource and configuration data that may be desired for a resource (e.g., for a data services resource). The definition of a resource may also include a priority associated with a resource, the preferred resource location, ordering (defining dependencies), resource fail counts, or other data pertaining to a resource. Thus, the cluster configuration 206 may include rules, expressions, constraints or policies (terms which will be utilized interchangeably herein) associated with a resource.

Cluster configuration 206 may also maintain storage area definitions 220 (e.g., also replicated across the nodes of the cluster) where each storage area definition 222 includes an identifier 224 for the storage area (e.g., which may be user assigned or software generated, etc.) and a pipeline definition 226 of the pipeline for the storage area, including the storage location 228 for that storage area (e.g., the storage node, volume or namespace where the data for storage area will get stored). A pipeline definition 226 for a storage area may comprise an ordered set of storage targets, where each storage target in the path may be associated with one or more data services to perform on the data for that storage area, and wherein the last storage target (e.g., the storage location) in the pipeline may be associated with storage of that data.

In one embodiment, storage cluster configurator 214 may include an interface 240 to allow a user to define a storage area. It will be noted here, that this interface may be a part of other management software for a cluster or may be a part of some storage cluster configurators 214 but not other embodiments of storage cluster configurators, etc. In any event, as storage area definitions 220 are replicated across storage nodes of the cluster, a storage area definition 222 entered in storage area definitions 220 on any node of the storage cluster will be replicated across the nodes of the entire storage cluster (e.g., regardless of the node access to define such a storage area).

It may now be useful to discuss embodiments of a storage cluster configurator in more detail. Turning to FIG. 2, then one embodiment of an architecture for a storage cluster configurator 214 for use on nodes of a storage cluster is depicted. The storage cluster configurator 214 may include a cluster communications manager 202. This cluster communications manager 202 may utilize a communication framework for the entire cluster to see a consistent set of ordered messages. The messages are delivered in the same sequence on each node in the cluster, allowing all nodes to remain consistent on cluster configuration changes.

This layer may also be responsible for maintaining cluster membership, where all nodes are constantly communicating with all other nodes to prove they are still functional. Any failure to receive a heartbeat notification may be detected by any other member of the cluster (e.g., the storage cluster configurator 214 on another node of the cluster). Upon detection, the remaining nodes use the in-order communication network to mark the failed node offline. This cluster communications manager 202 may be part of, or in communication with, cluster management software such as that utilized with Etcd or MongoDB.

Storage cluster configurator 214 may also include a cluster resource manager 204 used to manage abstract resources in a cluster of computers. The resources may represent actual resources (either logical or physical) in the cluster. These resources may be started (or associated with) one or more nodes in the cluster. The resources are substantially constantly (e.g., at an interval) monitored to ensure they are operating correctly, for example, by checking for fatal crashes or deadlocks that prevent normal operation. If any failure is detected, the resource manager 204 uses a set of rules or priorities to attempt to resolve the problem.

The implementation of the storage cluster (e.g., an NVMeoF cluster) requires understanding the underlying hardware platforms and software configuration (e.g., data services configurations). The information about the available programmable interfaces (such as partitioned PCIe switch models), drive locations (such as slots and PCIe switch port locations), data services locations on target nodes, and other configurations are listed in a configuration file.

In particular, the resource manager 204 may include a cluster configuration 206. This cluster configuration 206 can be synchronized across the storage cluster configurators 214 on each node of the cluster by the resource manager 204. In one embodiment, the configuration 206 may allow the resource manager 204 and storage cluster configurator 214 to understand the underlying hardware platform and the data services deployed thereon. The information about the available programmable interfaces (e.g., such as partitioned PCIe switch models), drive locations (such as slots and PCIe switch port locations), and other resources and behaviors are listed in the cluster configuration 206.

Accordingly, in one embodiment, the cluster configuration 206 may include resource definitions 230 that define the set of resources (e.g., logical or physical) of the cluster. The resources of the cluster may be hardware or software resources (including logical or virtual resources) of the cluster, including the data service resources of the cluster. The cluster configuration 206 may accordingly define storage resources, such as drives, groups of drives, partitions, volumes, namespaces, logical unit numbers (LUNs), data services of the cluster 100, etc.

The definition for a resource may include, for example, the name for a resource within the cluster, a type of the resource, a location or address for the resource and configuration data that may be desired for a resource (e.g., for a data services resource). The definition of a resource may also include a priority associated with a resource, the preferred resource location, ordering (defining dependencies), resource fail counts, or other data pertaining to a resource. Thus, the cluster configuration 206 may include rules, expressions, constraints or policies (terms which will be utilized interchangeably herein) associated with a resource.

Cluster configuration 206 may also maintain storage area definitions 220 (e.g., also replicated across the nodes of the cluster) where each storage area definition 222 includes an identifier 224 for the storage area (e.g., which may be user assigned or software generated, etc.) and a pipeline definition 226 of the pipeline for the storage area, including the storage location 228 for that storage area (e.g., the storage node, volume or namespace where the data for storage area will get stored). A pipeline definition 226 for a storage area may comprise an ordered set of storage targets, where each storage target in the path may be associated with one or more data services to perform on the data for that storage area, and wherein the last storage target (e.g., the storage location) in the pipeline may be associated with storage of that data. Thus, each hop or step of the pipeline definition may include an identification of a particular storage node, an identification of any data service on that storage node to perform on the data, a configuration for any defined data service to be performed on that storage node, or an identification of a type or location of storage on the storage node to be utilized to store data for the defined storage area.

In one embodiment, storage cluster configurator 214 may include an interface 240 to allow a user to define a storage area. It will be noted here, that this interface may be a part of other management software for a cluster or may be a part of some storage cluster configurators 214 but not other embodiments of storage cluster configurators, etc. In any event, as storage area definitions 220 are replicated across storage nodes of the cluster, a storage area definition 222 entered in storage area definitions 220 on any node of the storage cluster will be replicated across the nodes of the entire storage cluster (e.g., regardless of the node access to define such a storage area).

Using interface 240 a user (e.g., either human or automated) at a compute node may request a definition of, or access to, a storage area. When a request for a storage area (e.g., a request for a volume or a namespace, etc.) is received at interface 240 application in the storage cluster a set of configuration parameters may be obtained in association with that storage, including for example, whether block storage or a key/value namespace is desired along with any data services desired to implement for that storage area (e.g., data encoding, RAID level, etc.).

Specifically, a user (e.g., either human or automated) at a compute node may request a definition of, or access to, a storage area. When a request for a storage area (e.g., a request for a volume or a namespace, etc.) is received at the interface 240, the user may be presented with an interface allowing the user to select one or more data services, including for example, date encoding, RAID levels, encryption, or other types of data services. The user may also be presented with the ability to define parameters for those data services, such as a format in which to encode the data, a password to use for encryption, a type of encryption to utilize or other configuration parameters associated with the user selected data services. The user may also be presented with an interface to select a type of the storage area desired such as a block storage volume or a key/value namespace.

Based on the configuration parameters selected by the user for the storage area, storage cluster configurator 214 may then be utilized to define the requested storage area. The resource manager 204 of the storage cluster configurator 214 may evaluate the configuration parameters from the storage request from the user received through the interface 240 in association with the resource definitions 230 of the cluster configuration to determine a pipeline for the requested storage area.

The determined pipeline may comprise an ordered set of data service targets (e.g., that include requested data services) or storage targets (e.g., including storage) that can serve to meet the definition of the storage area provided by the user. Such a determination may be made by determining, for each data service or type of storage requested by the user, a storage target in the cluster that can provide the requested data service or type of storage. Other criteria may also be utilized in making such a determination, including for example, the configuration or capabilities of such storage targets or the relative load on such storage targets. Based on the determined path, a location for the requested storage to return to the requestor.

The resource manager 204 can then update storage area definitions 220 with a new storage area definition 222 for the newly defined storage area (e.g., which will be replicated across the nodes of the cluster). The newly updates storage area definition 222 will include the identifier 224 for the storage area, the determined pipeline definition 226 of the pipeline for the storage area, including the storage location 228 for that storage area (e.g., the storage node, volume or namespace where the data for storage area will get stored). Again, each hop or step of the pipeline definition 226 for the storage area definition 222 may include an identification of a particular storage node, an identification of any data service on that storage node to perform on the data, a configuration for any defined data service to be performed on that storage node, or an identification of a type or location of storage on the storage node to be utilized to store data for the defined storage area.

Additionally, after the pipeline definition 226 for the requested storage area is determined the storage cluster configurator 214 may configure the storage nodes of the cluster associated with each of the steps of the determined pipeline. This configuration may comprise configuring the storage node associated with each step of the pipeline definition to receive data associated with that storage area (e.g., from a user or a storage node associated with a previous step in the pipeline) and perform the associated data service or storage of data for that data associated with that step in the pipeline definition. This configuration can be accomplished using, for example, a storage area object 286 associated with each hop in the pipeline definition 226 of the storage area.

A storage area object 286 may include an identifier for the storage area 292, a service definition 294 (e.g., including a data service to perform on received data and any configuration for that data service) and a destination definition defining a location in the storage cluster where the data for the storage area is to be routed or stored. Additionally, in some embodiments, the storage area object 286 may include an identifier of a previous node in the pipeline definition or an identification of the storage node associated with that hop in the pipeline definition 226 such that a storage node may access the storage objects 286 stored in the storage cluster configurator 214 at that storage node to determine storage objects 286 associated with that storage node and an identified storage area.

A storage objects 286 associated with a particular storage node in the cluster (e.g., associated with a hop in a pipeline definition) may be defined at that storage node by sending a request to an interface 240 of the storage cluster configurator 214 at that storage node requesting to define a storage object for that node along with the data for that storage object 286. Alternatively storage objects 286 for every storage node in the pipeline definition 226 may be defined at that storage cluster configurator 214. These storage objects 286 may then be replicated across the storage cluster configurators 214 at each storage node of the storage cluster (e.g., using the cluster communication manager 202).

Once the storage area requested by the user through the interface 240 is defined, a location may be returned to the user for accessing the storage area. The location returned to the user for accessing the defined storage area may be a location (e.g., network address) of the first storage node in the pipeline defined for the storage area or the storage location where data for the defined storage area where data for the storage area will be stored. It will be noted, however, that the location returned to the user for accessing the defined storage area may substantially any node in the storage cluster as each storage node may have access to the replicated storage area definition 220 and may seamlessly communicate to the other nodes though the switch and communication medium without any need for protocol translation. Thus, in cases where a storage node receives an access request (e.g., an I/O request) for a storage area, and the receiving storage node is not in the first node in the pipeline associated with that storage area, the receiving storage node may just route the access request to the first storage node (e.g., the first hop) in the pipeline.

Figure 3:
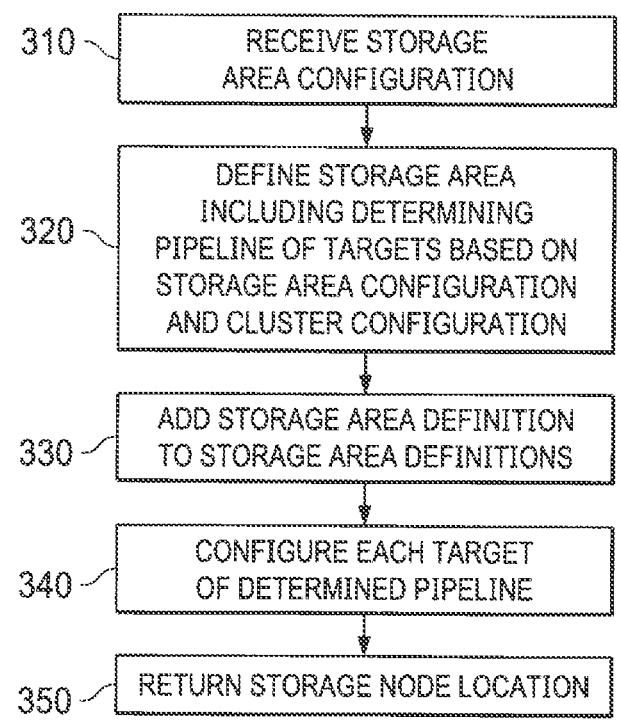
FIG. 3 is a flow diagram of one embodiment of a method for configuring a storage area in a disaggregated storage network.

FIG. 3 depicts one embodiment of a method for defining a storage area in a disaggregated storage cluster according to embodiments. A user (e.g., either human or automated) at a compute node may request a definition of, or access to, a storage area. When a request for a storage area (e.g., a request for a volume or a namespace, etc.) is received at a storage node in the storage cluster (STEP 310) a set of configuration parameters may be obtained in association with the defined storage area.

Specifically, a user (e.g., either human or automated) at a compute node may request a definition of, or access to, a storage area. When a request for a storage area (e.g., a request for a volume or a namespace, etc.) is received the user may be presented with an interface allowing the user to select one or more data services, including for example, date encoding, RAID levels, encryption, or other types of data services. The user may also be presented with the ability to define parameters for those data services, such as a format in which to encode the data, a password to use for encryption, a type of encryption to utilize or other configuration parameters associated with the user selected data services. The user may also be presented with an interface to select a type of the storage area desired such as a block storage volume or a key/value namespace. These configuration parameters may be received as part of the storage area configuration defined by the user (STEP 310).

Based on the configuration parameters selected by the user for the storage area, the requested storage area can then be defined (STEP 320). In one embodiment, the storage area configuration (e.g., the configuration parameters from the storage request received from the user) can be used in association with the cluster configuration to determine a pipeline for the requested storage area.

The determined pipeline may comprise an ordered set of data service targets (e.g., that include requested data services) or storage targets that can serve to meet the definition of the storage area provided by the user. Such a determination may be made by determining, for each data service or type of storage requested, a storage target in the cluster that can provide the requested data service or type of storage. Other criteria may also be utilized in making such a determination, including for example, the configuration or capabilities of such storage targets or the relative load on such storage targets. Based on the determined path, a location for the requested storage to return to the requestor.

Storage area definitions of the storage cluster can then be updated with a new storage area definition for the newly defined storage area (e.g., which will be replicated across the nodes of the cluster) (STEP 330). The newly updates storage area definition will include the identifier for the storage area, the determined pipeline definition of the pipeline for the storage area, including the storage location for that storage area (e.g., the storage node, volume or namespace where the data for storage area will get stored). Each hop or step of the pipeline definition for the storage area definition may include an identification of a particular storage node, an identification of any data service on that storage node to perform on the data, a configuration for any defined data service to be performed on that storage node, or an identification of a type or location of storage on the storage node to be utilized to store data for the defined storage area.

Additionally, the storage nodes of the cluster associated with each of the steps of the determined pipeline may be configured to implement the defined pipeline for the storage area (STEP 340). This configuration may comprise configuring the storage node associated with each step of the pipeline definition to receive data associated with that storage area (e.g., from a user or a storage node associated with a previous step in the pipeline) and perform the associated data service or storage of data for that data associated with that step in the pipeline definition. This configuration can be accomplished using, for example, a storage area object associated with each hop in the pipeline definition of the storage area.

A storage area object may include an identifier for the storage area, a service definition e.g., including a data service to perform on received data and any configuration for that data service) and a destination definition defining a location in the storage cluster where the data for the storage area is to be routed or stored. Additionally, in some embodiments, the storage area object may include an identifier of a previous node in the pipeline definition or an identification of the storage node associated with that hop in the pipeline definition such that a storage node may access the storage objects stored in the storage cluster configurator at that storage node to determine storage objects associated with that storage node and an identified storage area.

A storage objects associated with a particular storage node in the cluster (e.g., associated with a hop in a pipeline definition) may be defined at that storage node by sending a request to that storage node requesting to define a storage object for that node along with the data for that storage object. Alternatively storage objects for every storage node in the pipeline definition may be defined at that storage cluster configurator defining the storage area such that the defined storage objects may then be replicated across the storage cluster at each storage node of the storage cluster.

Once the storage area is defined, a location may be returned to the user for accessing the storage area (STEP 350). The location returned to the user for accessing the defined storage area may be a location of the first storage node in the pipeline defined for the storage area or the storage location where data for the defined storage area where data for the storage area will be stored. It will be noted, however, that the location returned to the user for accessing the defined storage area may substantially any node in the storage cluster.

Figure 4A:
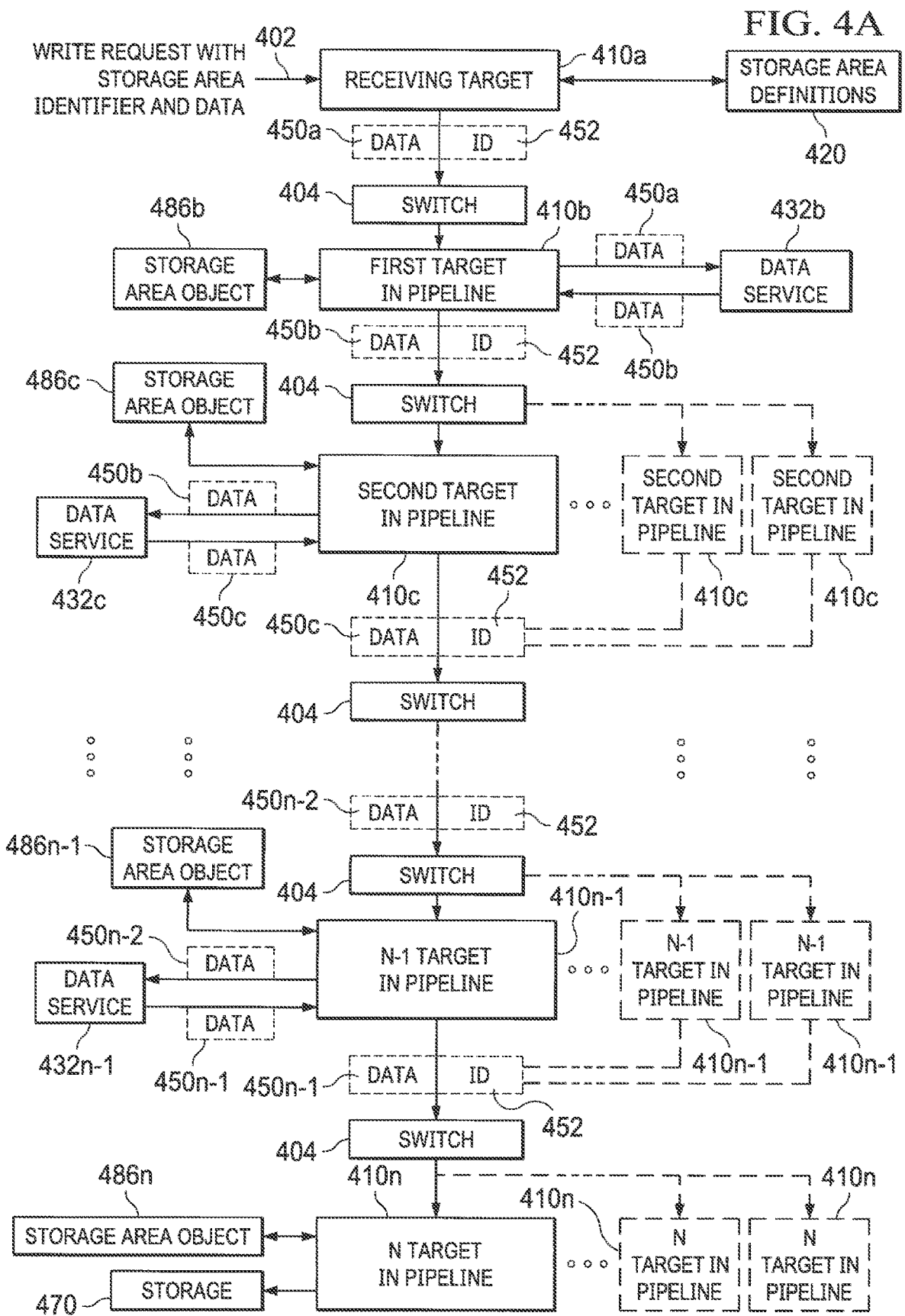
FIG. 4A is a flow diagram of one embodiment of a method for processing a request in a disaggregated storage network.
Figure 4B:
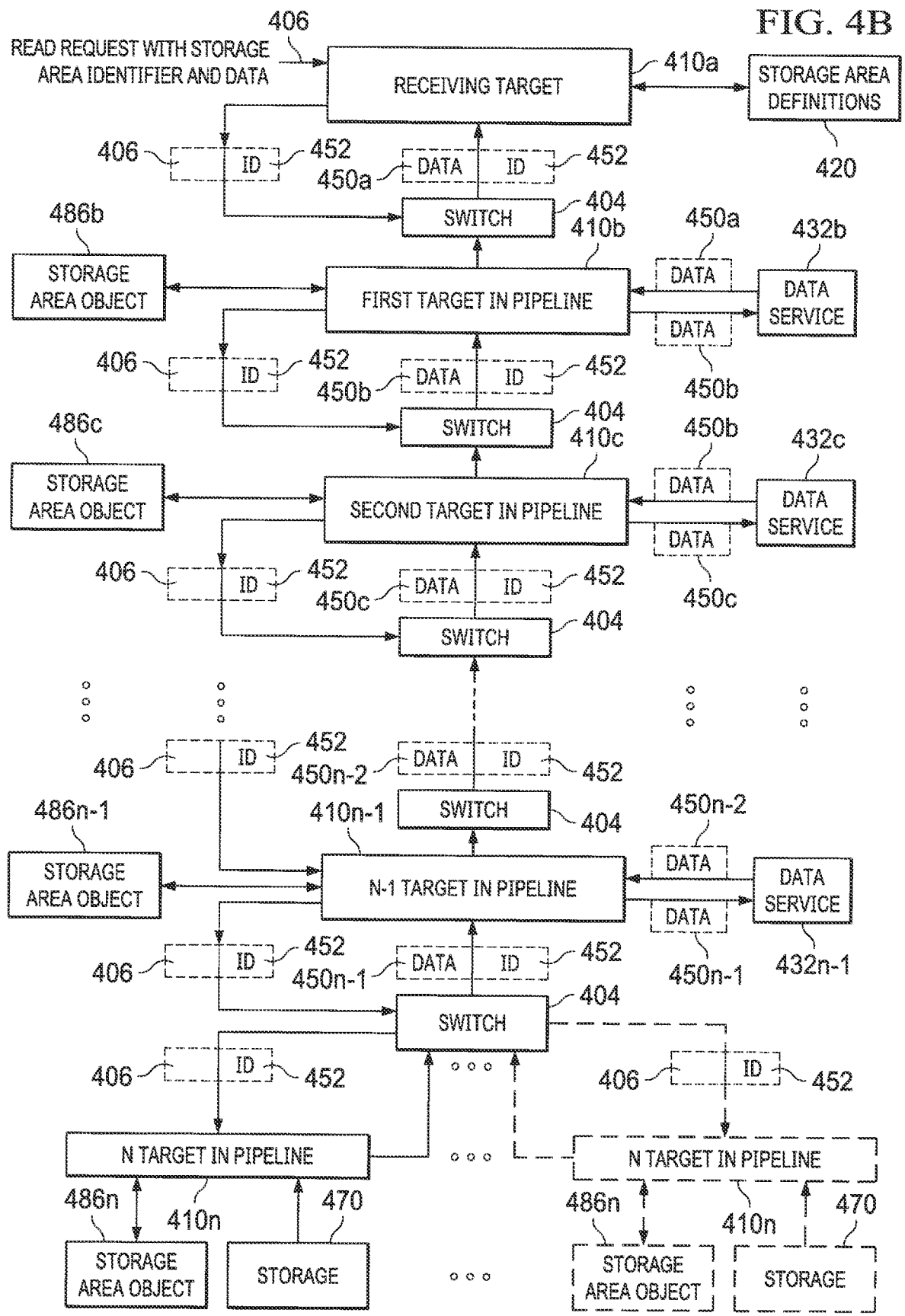
FIG. 4B is a flow diagram of one embodiment of a method for processing a request in a disaggregated storage network.

Moving now to FIGS. 4A and 4B, flow diagrams for one embodiment of the handling of I/O requests for a defined storage area with an associated pipeline definition in a disaggregated storage cluster are depicted. Turning first to FIG. 4A, a flow diagram for one embodiment of the handling of a write request for a storage area is depicted. At some point after a storage area (e.g., namespace or volume with associated pipeline definition) is defined in the disaggregated storage cluster, a write request for the storage area may be received 402. This write request may identify the storage area (e.g., include an identifier for the storage area) or a portion of the storage area to access (e.g., an address, length, or block of the storage area or a key for the storage area) (the storage area or portion thereof are collectively referred to herein as the storage identifier). The write request may also include the data to be written to the identified storage area. The write request may be sent to receiving storage target 410*a*. This receiving storage target 410*a* may be associated with the location returned to the user for accessing the storage area when it was designed.

The receiving storage target 410*a* may then access the storage area definitions 420 at that storage target 410*a* to determine the storage area definition associated with the identifier for the storage area as provided in the write request 402, including the pipeline definition for the identified storage area. The receiving storage target 410*a* can then route the data 450*a* as received in the write request 402 to the first storage target 410*b* defined in the pipeline definition for the storage area along with the storage area identifier 452 for the storage area. The storage area identifier 452 may be modified at each step in the pipeline, particularly the portion of storage to access may change. Other data associated with the write request may be provided, such as an identification of the request as a write request or other data associated with the received request 402. This communication (e.g., request) including the data 450*a* and identifier 452 may be routed through switch 404 without protocol translation using, for example, the same protocol utilized by all the storage nodes of the disaggregated storage cluster, and, in some embodiments, the same protocol as the protocol used in the reception of the write request 402 (e.g., from a computing node).

It will be noted here that the receiving storage target 410*a* may be the same as the first storage target 410*b*. In such instances, the receiving target 410*a* will not route the data 450*a* and identifier 452 to the first storage target 410*b* but instead may perform the operations described herein below with respect to the first storage target 410*b*.

When the first storage target 410*b* receives the communication including the data 450*a* and the storage identifier 452, the first storage target 410*b* may access the storage area objects on the first storage target 410*b* to identify a storage area object 486*b* associated with the received identifier 452 for that storage area. In embodiments where all storage area objects are replicated across all nodes of the storage cluster the first storage target 410*b* may identify the storage area object 486*b* associated with both that first storage target 410*b* and the received identifier 452 for that storage area.

Using the identified storage area object 486*b* for the identified storage area, the first storage target 410*b* can identify data service 432*b* on that storage target 410*b* associated with the pipeline definition for the identified storage area. The first storage target 410*b* can then route the data 450*a* to the identified data service 432*b* (e.g., as part of a request to process the data 450*a*). In some embodiments, the storage area object 486*b* may also include a configuration for the data service 432*b* on the first storage target 410*b*. In these embodiments, any identified configuration data for the data service 432*b* may also be provided to the data service 432*b* along with the request to process the data 450*a*.

The data service 432*b* (e.g., an encoder or transcoder, encryption service, or other type of data service) may process the data 450*a* and return the processed data 450*b* (e.g., which may be of a different size or type than received data 450*a*) to the first storage target 410*b* (e.g., the storage target 410 on which the data service 432*b* is deployed). When the data service 432*b* is done, the resulting data 450*b* can then be routed to the second storage target 410*b* defined in the pipeline definition for the storage area along with the storage area identifier 452 for the storage area. Specifically, using the identified storage area object 486b at the first storage target 410b for the identified storage area, a destination storage target 410 for data for that storage area to be sent (e.g., for a write request) from the first storage target 410b may be determined (here, second storage target 410c), and the data 450b generated at the first storage target 410b may be routed to the determined storage target 410c.

Other data associated with the write request may also be provided, such as an identification of the request as a write request or other data associated with the write request. Again, this communication (e.g., request) including the data 450b and identifier 452 may be routed through switch 404 without protocol translation using, for example, the same protocol utilized by all the storage nodes of the disaggregated storage cluster, and, in some embodiments, the same protocol as the protocol used in the reception of the write request 402 (e.g., from a computing node).

It will be noted here that the storage area identifier 452 may be modified by a target 410 (or data service 432) in the pipeline (e.g., along with the data 450) as the storage 470 or portion thereof (e.g., address, length, or block) to access may be changed based upon the data services or other operations being performed. For example, the portion of storage to access may be altered if a RAID data service is being performed as data may need to be striped across multiple portions of storage (e.g., because data may be broken into portions to save on different targets or may be striped across targets). Similarly, the length of data may change, if for example, data encoding or transcoding is supposed to be performed particularly the portion of storage to access may change. Thus, both data 450a may be different than 450b and storage identifier 450a may be different than storage identifier 450b. It will be understood that this alteration may occur at any step in the pipeline without loss of generality.

It will also be noted here that while the storage pipeline depicted is depicted as a sequenced set of storage targets 410, any step in the storage pipeline may "fan-out" storage from one target 410 to multiple targets 410 at any level in the pipeline. As one example, target 410b may send data 450b and identifier 452 to each target 410c in a group of targets 410c. Each request is composed of the original or modified ID 452 and a data portion 450b of the transformed original data 450a. This process may occur, for example, to stripe or encode data across multiple targets in parallel. Thus, in such cases the identified storage area object (e.g., storage area object 486b) at the storage target 410b may include a definition of each destination storage target 410c for data for that storage area to be sent (e.g., for a write request) from the first storage target 410b. These storage targets 410c may be determined and the data 450b generated at the first storage target 410b may be routed to each of the determined storage target 410c.

When the second storage target 410c in the pipeline receives the communication including the data 450b and the storage identifier 452, the second storage target 410c may perform substantially the same steps as first storage target 410b: accessing the storage area objects on the second storage target to identify a storage area object 486c associated with the received identifier 452 for that storage area and identifying data service 432c on that storage target 410c associated with the pipeline definition for the identified storage area.

The second storage target 410c can then route the data 450b to the identified data service 432c and receive the processed data 450c from the data service 432c. The resulting data 450c can then be routed to the next storage target 410 defined in the pipeline definition for the storage area along with the storage area identifier 452 for the storage area based on a destination defined in the identified storage area object 486c at the second storage target 410c of the pipeline definition for the identified storage area.

Again, it will also be noted here that each storage target 410c that received a request from storage target 410b may, in turn, "fan-out" storage from that target 410c to multiple targets 410. Thus, target 410c may send data 450c and identifier 452 to each target 410 in a group of targets 410. Each request is composed of the original or modified ID 452 and a data portion 450c of the transformed original data 450b.

The data 450 may be similarly routed and processed by the other storage targets 410 (and associated data service 432) as defined in the pipeline definition for the storage area before being routed to the penultimate storage target 450n-1 as defined in the pipeline definition and the data 405n-2 processed by the data service 432n-1 of the penultimate storage target 410n-1 of the pipeline to generate data 450n-1. Again, there may be multiple storage targets 410n-1 to which the data 450 and identifier 452 have been routed.

This data 450n-1 may then be routed to the last storage target 410n defined in the pipeline definition for the storage area along with the storage area identifier 452 for the storage area based on a destination defined in the identified storage area object 486n-1 at the penultimate storage target 410n-1 of the pipeline definition for the identified storage area.

When the last storage target 410n receives the communication including the data 450n-1 and the storage identifier 452, the last storage target 410n may access the storage area objects on the last storage target 410n to identify a storage area object 486n associated with the received identifier 452 for that storage area.

Using the identified storage area object 486n for the identified storage area, the last storage target 410n can identify a location of storage 470 on that storage target 410n associated with the pipeline definition for the identified storage area. The last storage target 410n can then store the data 450n-1 to the identified location of the storage 470.

As discussed, each storage target 410n-1 that received a request may, fan-out storage from that target 410n-1 to multiple targets 410n. Thus, target 410n-1 may send data 450n-1 and identifier 452 to each target 410n in a group of targets 410n. Each request is composed of the original or modified ID 452 and a data portion 450n-1 of the transformed original data 450n-2. It will be noted again that the data 450n-1 and identifier 452 sent be each storage target 410n-1 to each storage target 410n may be different. In this manner, different data (e.g., stripes, parity, encoded data, etc.) may be written to storage 470 at a set of storage targets 410n, and this data written across those storage targets 410n substantially in parallel.

Moving now to FIG. 4B, a flow diagram for the handling of a read request for a storage area in a disaggregated storage cluster is depicted. Such a read may be substantially the converse of a write as described. Here a read request 406 for the storage area may be received. This read request may identify the storage area (e.g., include an identifier for the storage area) or a portion of the storage area to access (e.g., an address or block of the storage area or a key for the storage area). The read request may be sent to receiving storage target 410a. This receiving storage target 410a may be associated with the location returned to the user for accessing the storage area when it was designed.

In one embodiment, the receiving storage target 410*a* may then access the storage area definitions 420 at that storage target 410*a* to determine the storage area definition associated with the identifier for the storage area as provided in the read request 406, including the pipeline definition for the identified storage area. The receiving storage target 410*a* may send the request to the first target 410*b* in the pipeline, modifying the ID 452 if needed.

When the first storage target 410*b* receives the communication 406 including the storage identifier 452, the first storage target 410*b* may access the storage area objects on the first storage target 410*b* to identify a storage area object 486*b* associated with the received identifier 452 for that storage area. Using the identified storage area object 486*b* for the identified storage area and the type of the request 406 (e.g., a read request) it can be determined if any modification to the storage area identifier 452 of the request is needed and a destination storage target 410 for a read request for the identified storage area may be determined (here, second storage target 410*c*). The read request 406 and the storage identifier 452 (e.g., modified if needed) can then be routed to the identified storage target (e.g., here second storage target 410*c*).

This routing of the request 406 and the storage area identifier 452 continues through the storage targets 410 of the storage pipeline until the request 406 is routed from the penultimate storage target 410*n*-1 to last storage target 410*n* of the pipeline where the data to be read is stored. As discussed above, there may be multiple storage targets 410*n* on which data to be read may reside, in such cases the request 406 and the storage area identifier 452 (e.g., specific to the storage area and the storage target 410*n*) may be routed to each of the last storage targets 410*n* on which data for that storage area is stored, such that the data may be read in parallel from those storage targets 410*n*.

Thus, the read request 406 is routed to the last storage target 410*n* defined in the pipeline definition for the storage area along with the storage area identifier 452 for the storage area. Other data associated with the read request may be provided, such as an identification of the request as a read request or other data associated with the received request 406. This communication (e.g., request) including the identifier 452 may be routed through switch 404 without protocol translation using, for example, the same protocol utilized by all the storage nodes of the disaggregated storage cluster, and, in some embodiments, the same protocol as the protocol used in the reception of the read request 406 (e.g., from a computing node).

It will again be noted here that the receiving storage target 410*a* may be the same as the last storage target 410*n*. In such instances, the receiving target 410*a* will not route the request and identifier 452 to the last storage target 410*n* but instead may perform the operations described herein below with respect to the last storage target 410*n*.

When the last storage target 410*n* receives the communication including the data 450*a* and the storage identifier 452, the last storage target 410*n* may access the storage area objects on the last storage target 410*n* to identify a storage area object 486*n* associated with the received identifier 452 for that storage area. In embodiments where all storage area objects are replicated across all nodes of the storage cluster the last storage target 410*n* may identify the storage area object 486*n* associated with both that last storage target 410*n* and the received identifier 452 for that storage area.

Using the identified storage area object 486*n* for the identified storage area, the last storage target 410*n* can identify the location of storage 470 on that storage target 410*n* associated with the pipeline definition for the identified storage area and the read request 406. The last storage target 410*n* can then read the requested data 450*n*-1 from the identified location of the storage 470.

When the data 450*n*-1 is read from storage 470, the resulting data 450*n*-1 can then be routed to the penultimate storage target 410*n*-1 defined in the pipeline definition for the storage area along with the storage area identifier 452 for the storage area. Specifically, using the identified storage area object 486*n*-1 at the last storage target 410*n* for the identified storage area, a destination storage target 410 for data for that storage area to be sent (e.g., for a read request) from the last storage target 410*n* may be determined (here, penultimate storage target 410*n*-1), and the data 450*n*-1 read at the last storage target 410*n* may be routed to the determined storage target 410*n*-1.

Other data associated with the read request may also be provided, such as an identification of the request as a read request or other data associated with the read request. Again, this communication (e.g., request) including the data 450*n*-1 and identifier 452 may be routed through switch 404 without protocol translation using, for example, the same protocol utilized by all the storage nodes of the disaggregated storage cluster, and, in some embodiments, the same protocol as the protocol used in the reception of the read request 406 (e.g., from a computing node).

When the penultimate storage target 410*n*-1 receives the communication including the data 450*n*-1 and the storage identifier 452, the penultimate storage target 410*n*-1 may access the storage area objects on the penultimate storage target 410*n*-1 to identify a storage area object 486*n*-1 associated with the received identifier 452 for that storage area. In embodiments where all storage area objects are replicated across all nodes of the storage cluster the first storage target 410*b* may identify the storage area object 486*b* associated with both that penultimate storage target 410*n*-1 and the received identifier 452 for that storage area.

Using the identified storage area object 486*n*-1 for the identified storage area, the penultimate storage target 410*n*-1 can identify data service 432*n*-1 on that storage target 410*n*-1 associated with the pipeline definition for the identified storage area. The penultimate storage target 410*n*-1 can then route the data 450*n*-1 to the identified data service 432*n*-1 (e.g., as part of a request to process the data 450*n*-1). In some embodiments, the storage area object 486*n*-1 may also include a configuration for the data service 432*n*-1 on the penultimate storage target 410*n*-1 (e.g., to use for a read request). In these embodiments, any identified configuration data for the data service 432*n*-1 (e.g., as included in the storage area object 486*n*-1) may also be provided to the data service 432*n*-1 along with the request to process the data 450*n*-1.

The data service 432*n*-1 (e.g., an encoder or transcoder, encryption service, or other type of data service) may process the data 450*n*-1 and return the processed data 450*n*-2 to the penultimate storage target 410*n*-1 (e.g., the storage target 410 on which the data service 432*n*-1 is deployed). When the data service 432*n*-1 is done, the resulting data 450*n*-1 can then be routed to the next storage target defined in the pipeline definition for the storage area along with the storage area identifier 452 for the storage area. Specifically, using the identified storage area object 486*n*-1 at the penultimate storage target 410*n*-1 for the identified storage area, a destination storage target 410 for data for that storage area to be sent (e.g., for a read request) from the penultimate storage target 410*n*-1 may be determined and the data 450n-1 generated at the penultimate storage target 410-1 may be routed to the determined storage target 410.

The data 450 may be similarly routed and processed by the other storage targets 410 (and associated data service 432) as defined in the pipeline definition for the storage area before being routed to the second storage target 450c as defined in the pipeline definition and the data 405c processed by the data service 432c of the second storage target 410c of the pipeline to generate data 450b.

This data 450b may then be routed to the first storage target 410b defined in the pipeline definition for the storage area along with the storage area identifier 452 for the storage area based on a destination defined in the identified storage area object 486c at the second storage target 410c of the pipeline definition for the identified storage area.

When the first storage target 410b receives the communication including the data 450b and the storage identifier 452, the first storage target 410b may access the storage area objects on the first storage target 410b to identify a storage area object 486b associated with the received identifier 452 for that storage area. Using the identified storage area object 486b for the identified storage area, the first storage target 410b can identify data service 432b on that storage target 410b associated with the pipeline definition for the identified storage area. The first storage target 410b can then route the data 450b to the identified data service 432b (e.g., as part of a request to process the data 450b). The data service 432b (e.g., an encoder or transcoder, encryption service, or other type of data service) may process the data 450b and return the processed data 450a to the first storage target 410b (e.g., the storage target 410 on which the data service 432b is deployed).

When the data service 432b is done, the resulting data 450a can then be routed to the receiving storage target 410a to return the data 450a to the user in response 416 to the received request 406. Alternatively, the data 450a may be returned to the user directly from the first target 410b in the pipeline, as in certain embodiments, each node in a disaggregated storage cluster may be adapted to communicate with compute nodes through switch 404.

These, and other, aspects of the invention will be better appreciated and understood when considered in conjunction with the description and the accompanying drawings. The description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more I/O device(s). The I/O devices can include a keyboard, monitor, printer, electronic pointing device (such as a mouse, trackball, stylus, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A disaggregated storage cluster, comprising:
a switch; and
a plurality of storage targets coupled to each other through the switch and communicating with one another through the switch according to the same protocol, the storage targets comprising at least a first storage target including storage and a second storage target comprising a data services target including a data service, wherein
each of the storage targets comprises a storage area definition for a storage area synchronized across the storage targets, the storage area definition including an identifier for the storage area associated with a pipeline definition for the storage area, the pipeline definition including an ordered set of the plurality of storage targets, including the data service of the data services target followed by the storage of the first storage target,
wherein the second storage target is adapted to receive a first request for the storage area including first data and the identifier for the storage area, perform the data service on the first data based on the identifier for the storage area to produce second data and route the second data to the first storage target through the switch according to the protocol in association with the identifier, and
the first storage target is adapted to receive the second data and the identifier for the storage area from the second storage target through the switch according to the protocol in association with the identifier and store the second data in the storage at the first storage target based on the identifier for the storage area.

2. The disaggregated storage cluster of claim 1, wherein the first request is received from a third storage target, wherein the third storage target is adapted to receive the first request from a user, access the storage area definition for the storage area to determine the pipeline definition for the storage area and, based on the first request and the pipeline definition, route the first request to the second storage target through the switch according to the protocol.

3. The disaggregated storage cluster of claim 1, wherein the first storage target is adapted to receive a second request for the storage area and the identifier for the storage area, access the second data in the storage at the first storage target based on the identifier for the storage area and route the second data to the second storage target through the switch according to the protocol in association with the identifier, and
the second storage target is adapted to receive the second data and the identifier for the storage area from the first storage target through the switch according to the protocol in association with the identifier, perform the data service on the second data based on the identifier for the storage area to produce the first data and route the first data to a user in response to the second request.

4. The disaggregated storage cluster of claim 3, wherein the second request is received from a third storage target, and the third storage target is adapted to receive the second request from the user, access the storage area definition for the storage area to determine the pipeline definition for the storage area and, based on the second request and the pipeline definition, route the second request to the first storage target through the switch according to the protocol.

5. The disaggregated storage cluster of claim 1, wherein the protocol is Non-Volatile Memory Express (NVMe) over Fabrics.

6. The disaggregated storage cluster of claim 1, wherein the storage is a key/value store or block storage.

7. The disaggregated storage cluster of claim 1, wherein the data service includes a data transformation.

8. A non-transitory computer readable medium, comprising instructions for:
synchronizing a storage area definition across a plurality of storage targets coupled to each other through a switch and communicating with one another through the switch according to the same protocol, the storage targets comprising at least a first storage target including storage and a second storage target comprising a data services target including a data service, wherein the storage area definition includes an identifier for a storage area associated with a pipeline definition for the storage area, and the pipeline definition includes an ordered set of the plurality of storage targets, including the data service of the data services target followed by the storage of the first storage target;
at the second storage target:
receiving a first request for the storage area, the first request including first data and the identifier for the storage area;
performing the data service on the first data based on the identifier for the storage area to produce second data; and
routing the second data to the first storage target through the switch according to the protocol in association with the identifier;
at the first storage target:
receiving the second data and the identifier for the storage area from the second storage target through the switch according to the protocol in association with the identifier; and
storing the second data in the storage at the first storage target based on the identifier for the storage area.

9. The non-transitory computer readable medium of claim 8, wherein the first request is received from a third storage target and the instructions are further for, at the third storage target:
receiving the first request from a user;
accessing the storage area definition for the storage area to determine the pipeline definition for the storage area; and
based on the first request and the pipeline definition, routing the first request to the second storage target through the switch according to the protocol.

10. The non-transitory computer readable medium of claim 8, wherein the instructions are further for:
at the first storage target:
receiving a second request for the storage area and the identifier for the storage area, accessing the second data in the storage at the first storage target based on the identifier for the storage area, and routing the second data to the second storage target through the switch according to the protocol in association with the identifier, and
at the second storage target:
receiving the second data and the identifier for the storage area from the first storage target through the switch according to the protocol in association with the identifier, performing the data service on the second data based on the identifier for the storage area to produce the first data, and routing the first data to a user in response to the second request.

11. The non-transitory computer readable medium of claim 10, wherein the second request is received from a third storage target and the instructions are further for, at the third storage target:
  receiving the second request from the user;
  accessing the storage area definition for the storage area to determine the pipeline definition for the storage area; and
  based on the second request and the pipeline definition, routing the second request to the first storage target through the switch according to the protocol.

12. The non-transitory computer readable medium of claim 8, wherein the protocol is Non-Volatile Memory Express (NVMe) over Fabrics.

13. The non-transitory computer readable medium of claim 8, wherein the storage is a key/value store or block storage.

14. The non-transitory computer readable medium of claim 8, wherein the data service includes a data transformation.

15. A method, comprising:
  synchronizing a storage area definition across a plurality of storage targets coupled to each other through a switch and communicating with one another through the switch according to the same protocol, the storage targets comprising at least a first storage target including storage and a second storage target comprising a data services target including a data service, wherein the storage area definition includes an identifier for a storage area associated with a pipeline definition for the storage area, the pipeline definition includes an ordered set of the plurality of storage targets, including the data service of the data services target followed by the storage of the first storage target;
  at the second storage target:
  receiving a first request for the storage area, the first request including first data and the identifier for the storage area;
  performing the data service on the first data based on the identifier for the storage area to produce second data; and
  routing the second data to the first storage target through the switch according to the protocol in association with the identifier;
  at the first storage target:
    receiving the second data and the identifier for the storage area from the second storage target through the switch according to the protocol in association with the identifier; and
    storing the second data in the storage at the first storage target based on the identifier for the storage area.

16. The method of claim 15, wherein the first request is received from a third storage target and the method further comprises:
  at the third storage target:
  receiving the first request from a user;
  accessing the storage area definition for the storage area to determine the pipeline definition for the storage area; and
  based on the first request and the pipeline definition, routing the first request to the second storage target through the switch according to the protocol.

17. The method of claim 15, further comprising:
  at the first storage target:
  receiving a second request for the storage area and the identifier for the storage area, accessing the second data in the storage at the first storage target based on the identifier for the storage area, and routing the second data to the second storage target through the switch according to the protocol in association with the identifier, and
  at the second storage target:
  receiving the second data and the identifier for the storage area from the first storage target through the switch according to the protocol in association with the identifier, performing the data service on the second data based on the identifier for the storage area to produce the first data, and routing the first data to a user in response to the second request.

18. The method of claim 17, wherein the second request is received from a third storage target and the method further comprises:
  at the third storage target:
  receiving the second request from the user;
  accessing the storage area definition for the storage area to determine the pipeline definition for the storage area; and
  based on the second request and the pipeline definition, routing the second request to the first storage target through the switch according to the protocol.

19. The method of claim 15, wherein the protocol is Non-Volatile Memory Express (NVMe) over Fabrics.

20. The method of claim 15, wherein the storage is a key/value store or block storage.

21. The method of claim 15, wherein the data service includes a data transformation.

* * * * *